United States Patent [19]
Gamboa

[11] Patent Number: 5,851,025
[45] Date of Patent: Dec. 22, 1998

[54] AIR BAG DEACTIVATION BUCKLE

[76] Inventor: Martin G. Gamboa, 2016 C.N. Perry Ave., Calexico, Calif. 92231

[21] Appl. No.: 770,338

[22] Filed: Dec. 20, 1996

[51] Int. Cl.$^6$ .................................................. B60R 21/32
[52] U.S. Cl. ............................ 280/735; 180/268; 24/633
[58] Field of Search ................................ 280/735, 801.1; 180/268; 24/163 FC, 184, 633; 297/482

[56] References Cited

U.S. PATENT DOCUMENTS

| | | | |
|---|---|---|---|
| 3,745,523 | 7/1973 | Lewis et al. | 280/728.1 |
| 3,992,028 | 11/1976 | Abe et al. | 280/728.1 |
| 5,468,014 | 11/1995 | Gimbel et al. | 180/268 |
| 5,690,356 | 11/1997 | Lane, Jr. | 280/735 |

*Primary Examiner*—Daniel D. Wasil
*Attorney, Agent, or Firm*—Michael I. Kroll

[57] ABSTRACT

An air bag deactivation buckle (10) on a seat belt (12) for holding an infant (14) in an infant seat (16) securely in a seat (18) of a motor vehicle (20) comprising a frame (22) attached to a first end of the seat belt (12), the frame (22) having a slot (24) therein. A push button lock mechanism (26) is in the frame (22). A structure (28) is for covering the slot (24) in the frame (22) in a releasable manner. A component (30) in the frame (22) is for deactivating an air bag (32) in the motor vehicle (20). A tongue (34) is attached to a second end of the seat belt (18). When the tongue (34) is inserted into the slot (24) in the frame (22) after the covering structure (28) exposes the slot (24), the tongue (34) will engage with the push button lock mechanism (26) and the air bag deactivating component (30), to prevent inflation of the air bag (32) in case of a collision and eliminate endangerment to the infant (14) in the infant seat (16).

15 Claims, 6 Drawing Sheets

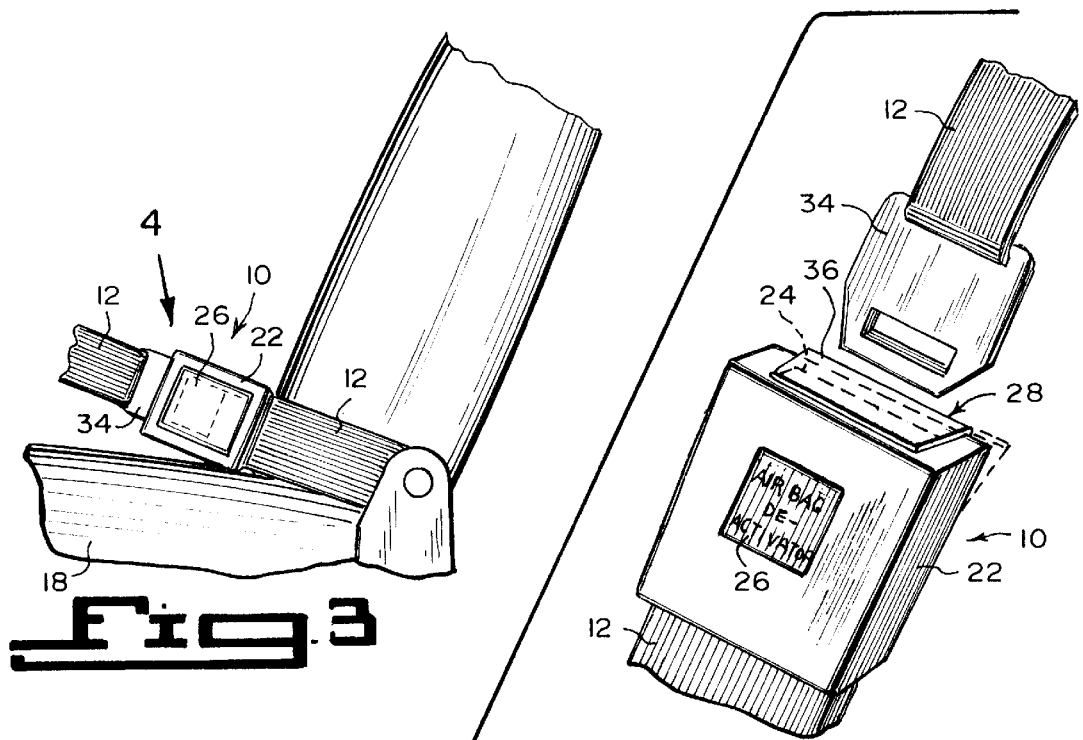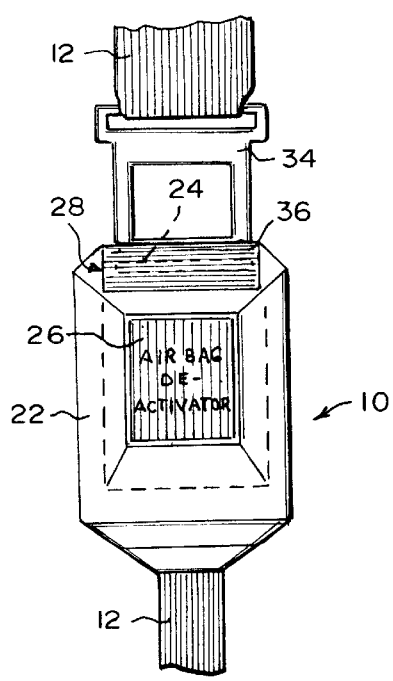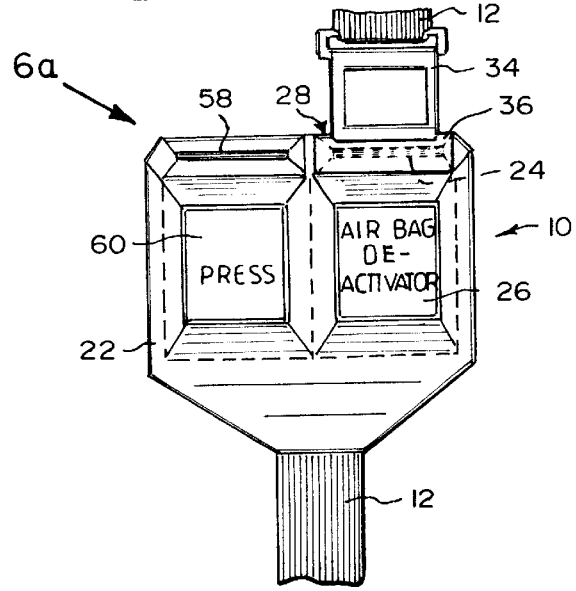

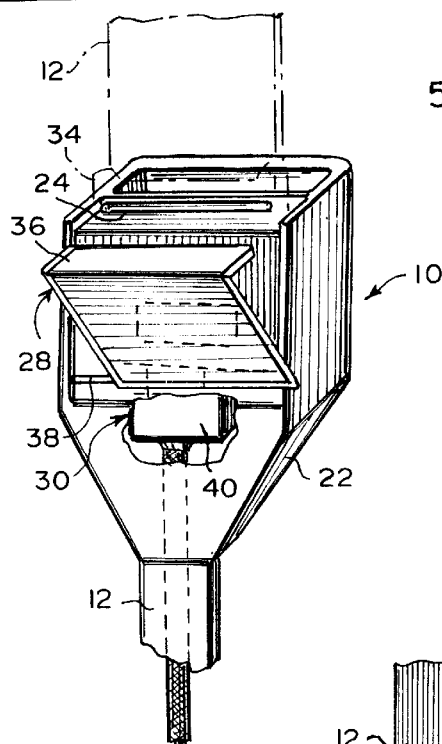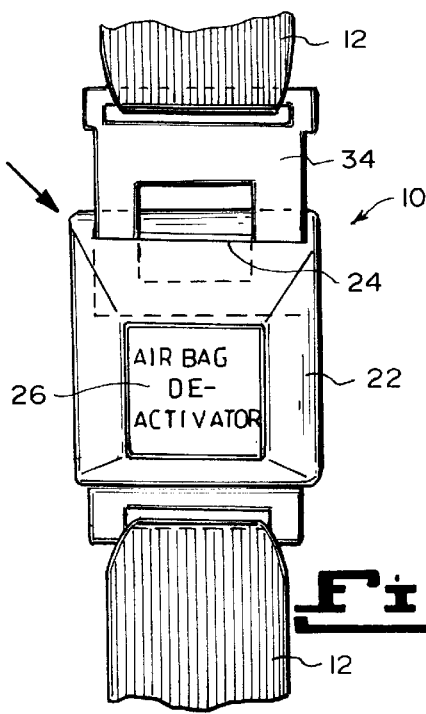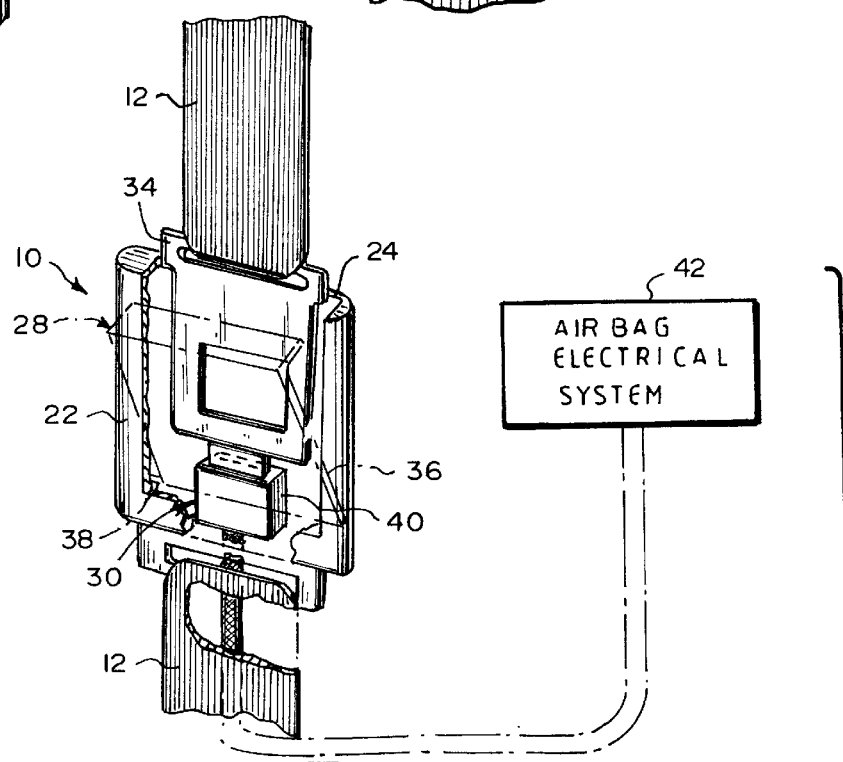

AIR BAG DEACTIVATION BUCKLE

BACKGROUND OF THE INVENTION

1. Field of the Invention

The instant invention relates generally to safety seat belts for motor vehicles and more specifically it relates to an air bag deactivation buckle that will prevent inflation of an air bag when an infant seat is locked onto a passenger seat in a motor vehicle.

Since its beginnings the automobile industry has developed many safety devices and features. One of the most significant safety devices is the seat belt. This helps prevent a person from being thrown from a car or tossed about in it when an accident occurs. An estimated 12,000 lives could be saved each year if all passengers and drivers used seat belts.

All cars are equipped with seat belts, and many have alarms that warns the drivers to fasten them before starting the vehicles. One alternative to seat belts is the air bag. This has a sensor that in a crash activates a gas cylinder in one tenth of a second. The cylinder inflates a nylon bag positioned, so that it will prevent a passenger from pitching forward.

In 1978 Tennessee became the first state to adopt child passenger protection legislation, requiring some sort of child restraint apparatus for children under four years of age. This resulted in a reduction of the fatal and serious injury rates in that state by 50 percent in 1978 and 71 percent in 1979. Since that time, almost all states have passed similar child passenger protection laws.

2. Description of the Prior Art

Numerous safety seat belts for motor vehicles have been provided in prior art that are adapted to protect the drivers and passengers within the motor vehicles from injury if the motor vehicles are involved in accidents, but will not control the automatic activation of air bags during accidents. While these units may be suitable for the particular purpose to which they address, they would not be as suitable for the purposes of the present invention as heretofore described.

SUMMARY OF THE INVENTION

A primary object of the present invention is to provide an air bag deactivation buckle that will overcome the shortcomings of the prior art devices.

Another object is to provide an air bag deactivation buckle that will lock an infant seat to a front passenger seat in a motor vehicle and automatically depress an air bag deactivator switch to prevent activation of an air bag, so that in case of a collision the air bag will not inflate and endanger the infant in the infant seat.

An additional object is to provide an air bag deactivation buckle that is a twin seat belt buckle, so that a person will have the option of using a first portion of the buckle to normally lock the seat belt about the person and by using a second portion of the buckle will be able to lock the seat belt in safety about an infant seat in a front passenger seat in a motor vehicle, wherein the air bag will not inflate.

A further object is to provide an air bag deactivation buckle that is simple and easy to use.

A still further object is to provide an air bag deactivation buckle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a side view taken in the direction of arrow 3 in FIG. 2, with the infant seat removed therefrom.

FIG. 4 is a front perspective view of the first embodiment taken in the direction of arrow 4 in FIG. 3, with the tongue disengaged.

FIG. 5 is a front perspective view of a first modified form of the first embodiment with the tongue disengaged.

FIG. 5a is a rear perspective view of a second modified form of the first embodiment with parts broken away and in phantom, showing the tongue engaged.

FIG. 5b is a front perspective view of a third modified form of the first embodiment with the tongue engaged.

FIG. 5c is a rear perspective view taken in the direction of arrow 5c in FIG. 5b, with parts broken away, in section, in phantom, and the tongue engaged.

FIG. 6 is a front perspective view of a second embodiment with the tongue disengaged.

Similar reference characters denote corresponding features consistently throughout the attached drawings.

DETAILED DESCRIPTION OF THE PREFERRED EMBODIMENTS

Figure 1:
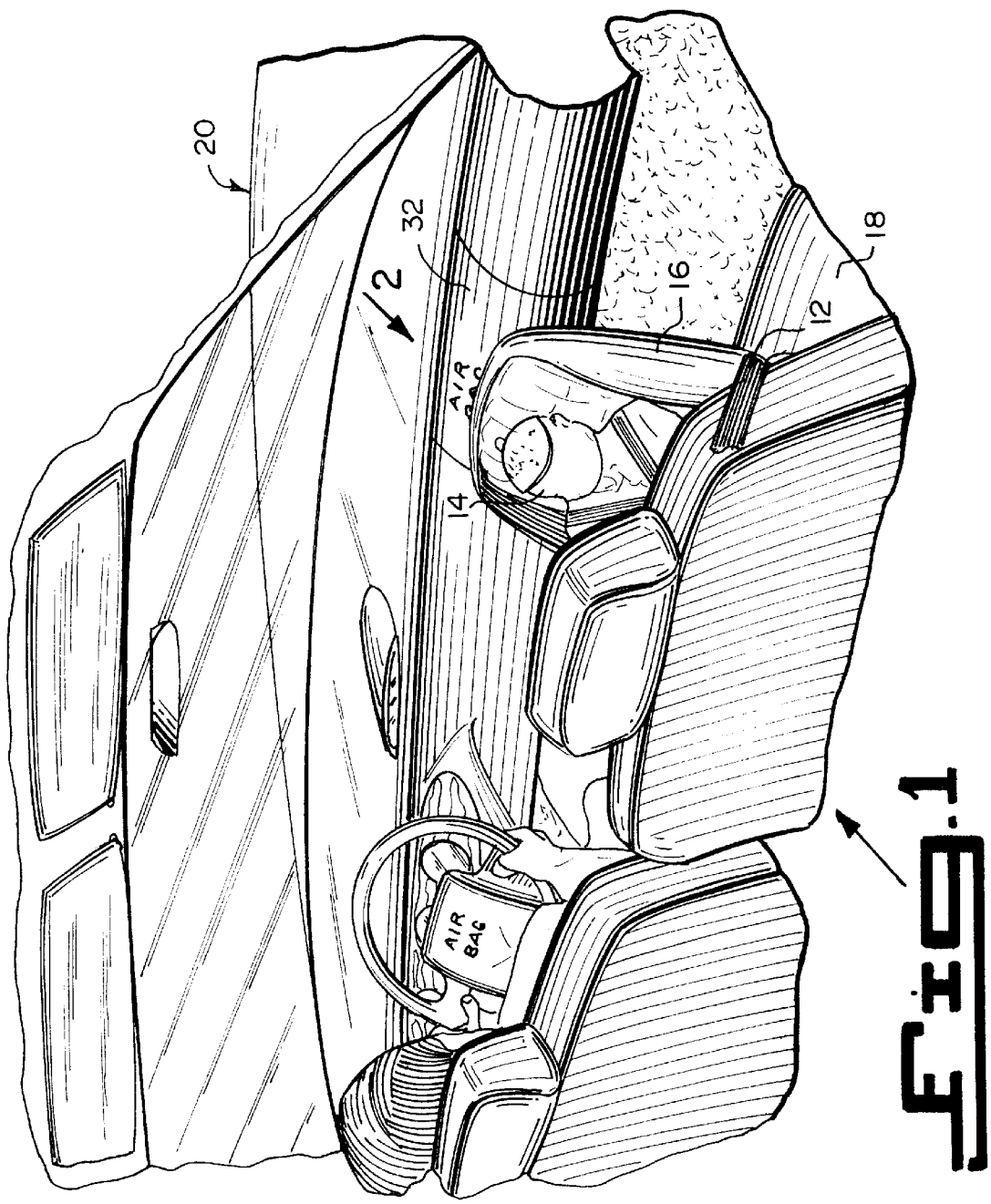
FIG. 1 is a rear perspective view of the interior of a portion of a motor vehicle, showing an infant seat locked in place to a front passenger seat by a seat belt.
Figure 2:
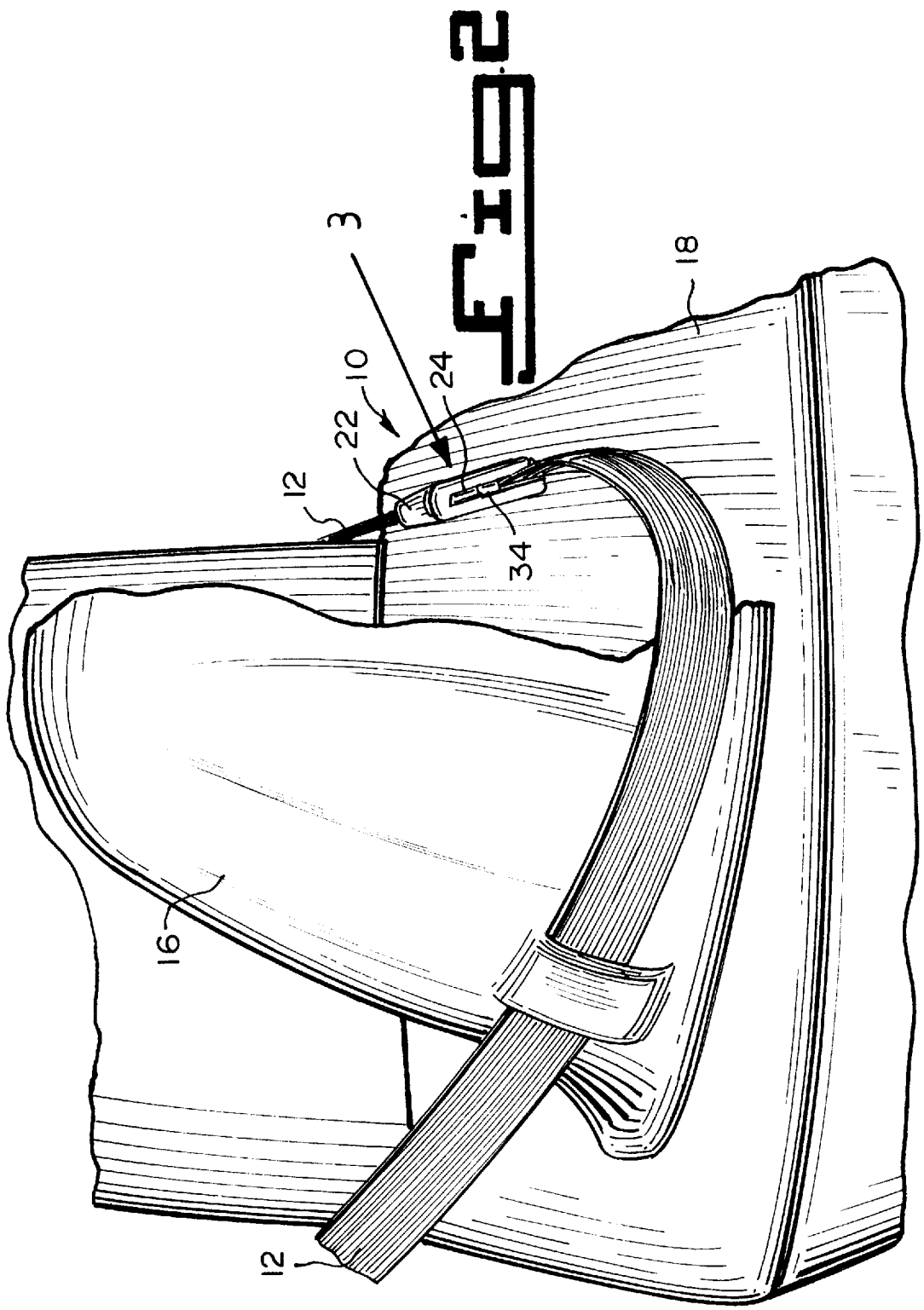
FIG. 2 is a front perspective view taken in the direction of arrow 2 in FIG. 1 with parts broken away, showing a first embodiment of the instant invention being a single seat belt buckle in use.

Turning now descriptively to the drawings, in which similar reference characters denote similar elements throughout the several views, FIGS. 1 to 7 illustrate an air bag deactivation buckle 10 on a seat belt 12 for holding an infant 14 in an infant seat 16 securely in a seat 18 of a motor vehicle 20, comprising a frame 22 attached to a first end of the seat belt 12, the frame 22 having a slot 24 therein. A push button lock mechanism 26 is in the frame 22. A structure 28 is for covering the slot 24 in the frame 22 in a releasable manner. A component 30 in the frame 22 is for deactivating an air bag 32 in the motor vehicle 20.

A tongue 34 is attached to a second end of the seat belt 18. When the tongue 24 is inserted into the slot 24 in the frame 22 after the covering structure 28 exposes the slot 24, the tongue 34 will engage with the push button lock mechanism 26 and the air bag deactivating component 30, to prevent inflation of the air bag 32 in case of a collision and eliminate endangerment to the infant 14 in the infant seat 16.

The covering structure 28 includes a safety cover 36 sized to block the slot 24. A hinge pin 38 connects the safety cover 36 to the frame 22. The safety cover 36 must be moved to expose the slot 24 in the frame 22, before the tongue 34 can be inserted into the slot 24.

The deactivating component 30 is a normally closed air bag deactivator switch 40. An air bag electrical system 42 is electrically connected to the air bag deactivator switch 40. When the tongue 34 engages the air bag deactivator switch 40, the air bag electrical system 42 will open to prevent inflation of the air bag 32.

Figure 7:
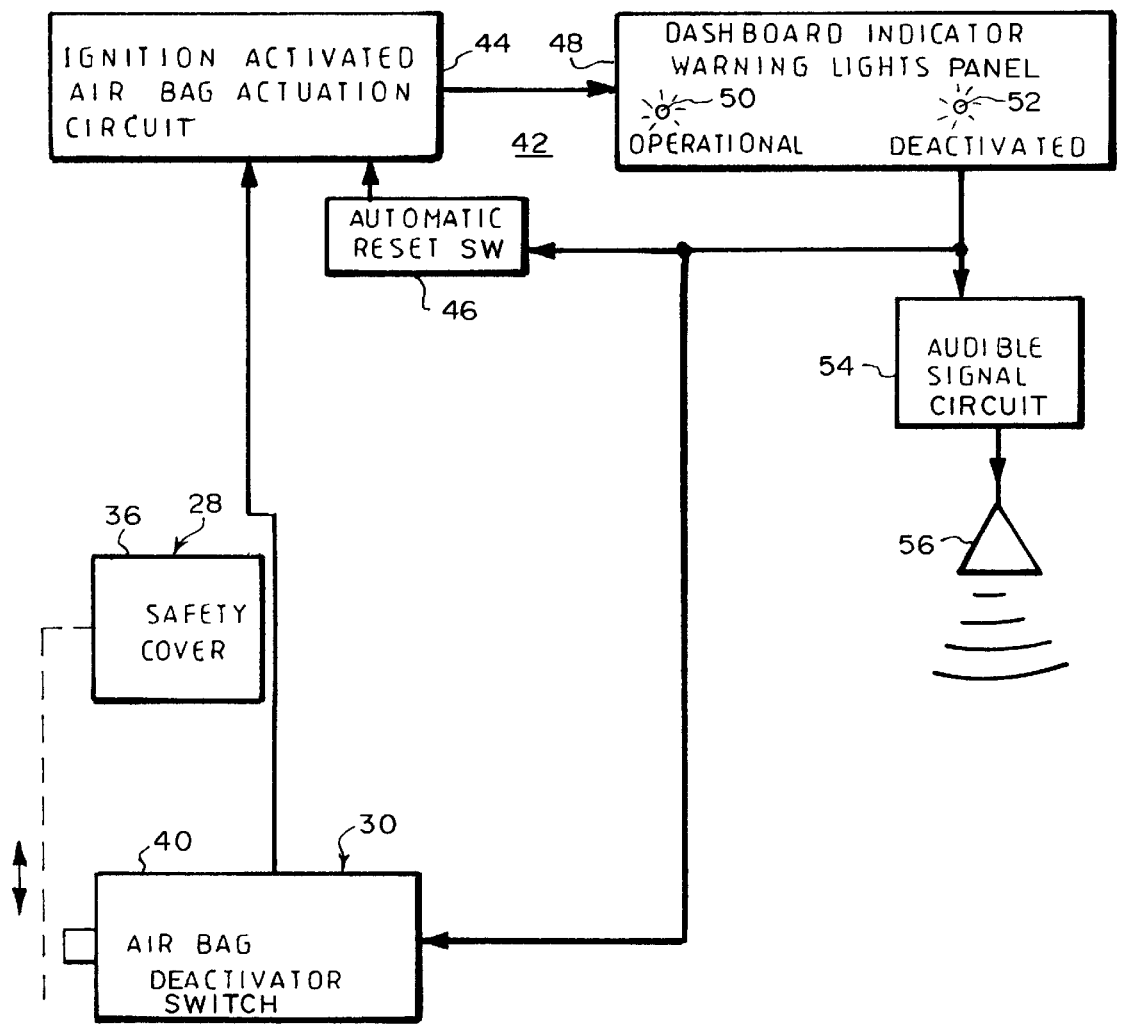
FIG. 7 is a diagrammatic block diagram of an electrical system for the instant invention.

The air bag electrical system 42, as best seen in FIG. 7, consists of an ignition activated air bag actuation circuit 44 electrically connected to the air bag deactivator switch 30. An automatic reset switch 46 is electrically connected to the ignition activated air bag actuation circuit 44.

Two dashboard indicator warning lights panel 48 is provided. One light 50 indicates the air bag 32 is operational, while the other light 52 indicates the air bag 32 is deactivated. An audible signal circuit 54 with a speaker 56 is electrically connected to the air bag deactivated light 52, so as to make an audio alarm when the air bag 32 is deactivated.

Figure 6B:
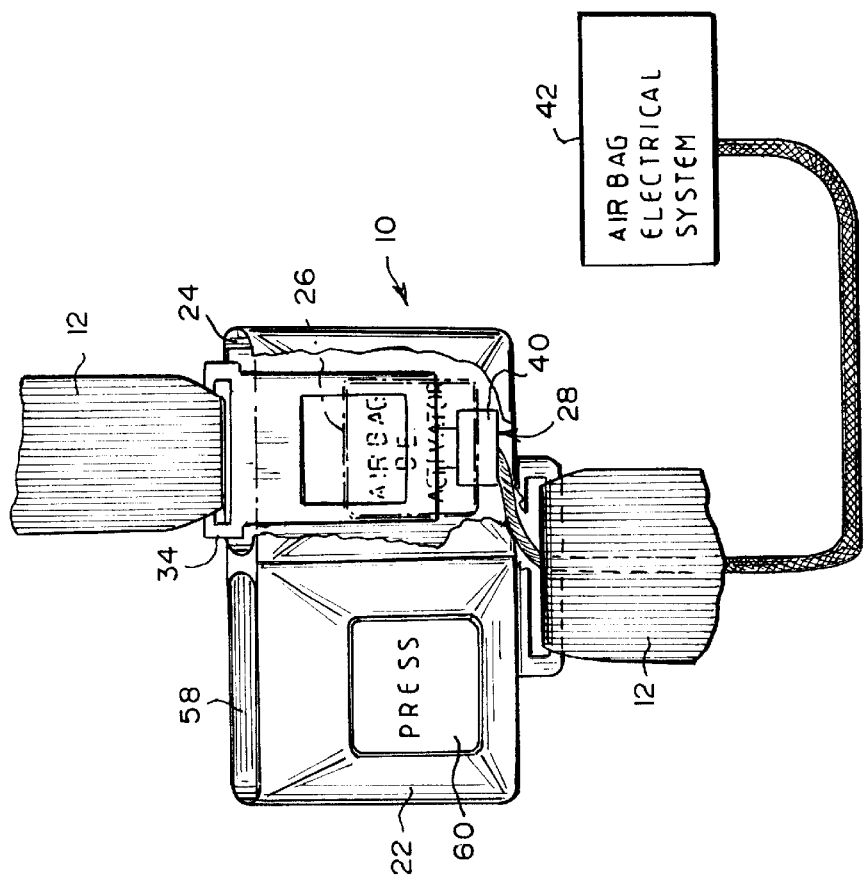
FIG. 6b is a front perspective view of a second modified form of the second embodiment with parts broken away, in phantom and the tongue engaged.
Figure 6A:
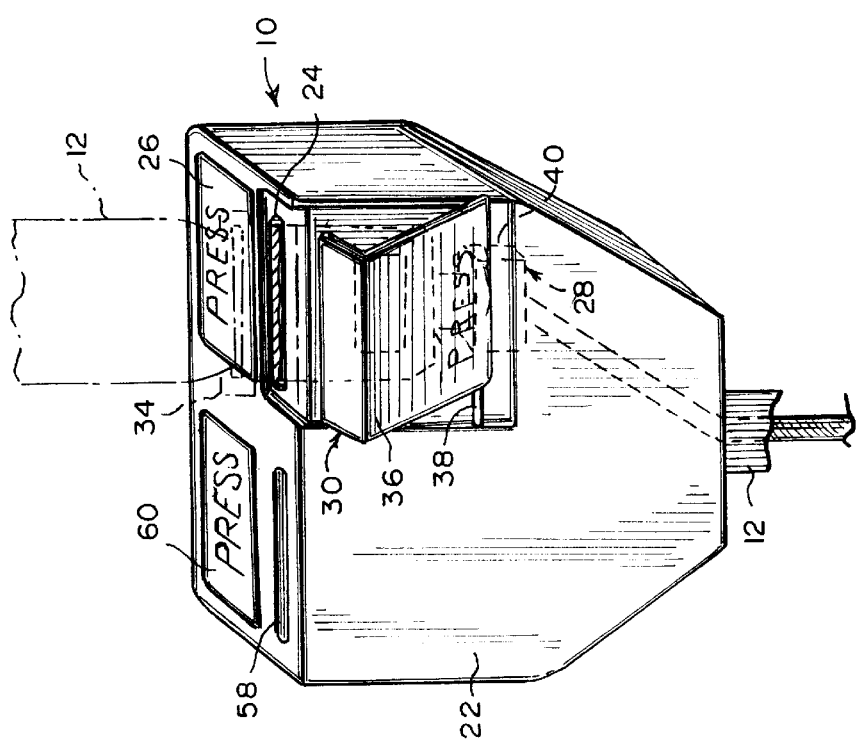
FIG. 6a is a rear perspective view taken in the direction of arrow 6a in FIG. 6, of a first modified form of the second embodiment with the tongue shown engaged and partly in phantom.

FIGS. 6, 6a and 6b show the frame 22 being of a double configuration, having a second slot 58 therein. A second push button lock mechanism 60 is adjacent the second slot 58 in the frame 22. A person can have a choice to insert the tongue 34 into the first slot 24, to prevent inflation of the air bag 32 when using the infant seat 16 on the seat 18 of the motor vehicle 20 and to then insert the tongue 34 into the second slot 58, to allow normal inflation of the air bag 32, when an adult passenger is held securely on the seat 18 of the motor vehicle 20 during a collision.

The frame 22, the push button lock mechanism 26, the safety cover 36 and the tongue 34 are all fabricated out of a strong durable material 62. The strong durable material 62 is stainless steel.

OPERATION OF THE INVENTION

To use the air bag deactivation buckle 10 in FIGS. 1 to 5c, the following steps should be taken:

1. Interconnect the seat belt 12 to the infant seat 16 with the infant 14 in it on the seat 18 in the motor vehicle 20.
2. Move the safety cover 36 away so that the slot 24 in the frame 22 is exposed.
3. Insert the tongue 34 into the slot 24 in the frame 22.
4. Engage the tongue 34 with the push button lock mechanism 26 in the frame 22.
5. Depress the air bag deactivator switch 40 with the tongue 34, so that the air bag electrical system 42 will open to prevent inflation of the air bag 32.
6. Insert the tongue 34 into the second slot 58 if using the double configuration frame 22 for an adult passenger, as shown in FIGS. 6 to 6b.
7. Engage the tongue 34 with the second push button lock mechanism 60 in the frame 22, thereby allowing normal inflation of the air bag 32.
8. Follow steps 1 to 5 above if the buckle 10 in FIGS. 6 to 6b is to be used with the infant seat 16.

LIST OF REFERENCE NUMBERS 10 air bag deactivation buckle
12 seat belt in 20
14 infant in 16
16 infant seat
18 seat in 20
20 motor vehicle
22 frame of 10
24 slot in 22
26 push button lock mechanism of 10
28 covering structure of 10
30 deactivating component of 10
32 air bag in 20
34 tongue of 10
36 safety cover of 28
38 hinge pin of 28
40 normally closed air bag deactivator switch for 30
42 air bag electrical system
44 ignition activated air bag actuation circuit of 42
46 automatic reset switch of 42
48 two dashboard indicator warning lights panel of 42
50 operational light of 48
52 deactivated light of 48
54 audible signal circuit of 42
56 speaker of 42
58 second slot in 22
60 second push button lock mechanism in 22
62 strong durable material (stainless steel) for 22, 26, 34 and 36.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An air bag deactivation buckle on a seat belt for holding an infant in an infant seat securely in a seat of a motor vehicle comprising:

a) a frame attached to a first end of the seat belt, said frame having a slot therein;

b) a push button lock mechanism in said frame;

c) means for covering said slot in said frame in a releasable manner;

d) means in said frame for deactivating an air bag in the motor vehicle; and e) a tongue attached to a second end of the seat belt, so that when said tongue is inserted into said slot in said frame after said covering means exposes said slot, said tongue will engage with said push button lock mechanism and said air bag deactivating means, to prevent inflation of the air bag in case of a collision and eliminate endangerment to the infant in the infant seat.

2. An air bag deactivation buckle as recited in claim 1, wherein said covering means includes:

a) a safety cover sized to block said slot; and b) a hinge pin connecting said safety cover to said frame, so that said safety cover must be moved to expose said slot in said frame before said tongue can be inserted into said slot.

3. An air bag deactivation buckle as recited in claim 1, wherein said deactivating means includes a normally closed air bag deactivator switch electrically connected to an air bag electrical system whereby when said tongue engages said air bag deactivator switch, the air bag electrical system will prevent inflation of the air bag.

4. An air bag deactivation buckle as recited in claim 3, wherein said air bag electrical system includes an ignition activated air bag actuation circuit electrically connected to said air bag deactivator switch.

5. An air bag deactivation buckle as recited in claim 4, wherein said air bag electrical system further includes two dashboard indicator warning lights panel, in which one said light indicates the air bag is operational, while other said light indicates the air bag is deactivated.

6. An air bag deactivation buckle as recited in claim 5, wherein said air bag electrical system further includes an audible signal circuit with a speaker electrically connected to said air bag deactivated light, so as to make an audio alarm when the air bag is deactivated.

7. An air bag deactivation buckle as recited in claim 1, further including:
  a) said frame being of a double configuration, having a second slot therein; and
  b) a second pushbutton lock mechanism adjacent said second slot in said frame providing a user with a choice between insertion of said tongue into said first slot, to prevent inflation of the air bag when using the infant seat on the seat of the motor vehicle and insertion of said tongue into said second slot to allow normal inflation of the air bag, when an adult passenger is held securely on the seat of the motor vehicle during a collision.

8. An air bag deactivation buckle as recited in claim 2, wherein said frame, said push button lock mechanism, said safety cover and said tongue are all fabricated out of stainless steel.

9. An air bag deactivation buckle on a seat belt for holding an infant in an infant seat securely in a seat of a motor vehicle comprising:
  a) a frame attached to a first end of the seat belt, said frame having a slot therein;
  b) a push button lock mechanism in said frame;
  c) means for covering said slot in said frame in a releasable manner, wherein said covering means includes a safety cover sized to block said slot and a hinge connecting said safety cover to said frame, so that said safety cover must be moved to expose said slot in said frame before said tongue can be inserted into said slot;
  d) means in said frame for deactivating an air bag in the motor vehicle; and
  e) a tongue attached to a second end of the seat belt, so that when said tongue is inserted into said slot in said frame after said covering means exposes said slot, said tongue will engage with said push button lock mechanism and said air bag deactivating means, to prevent inflation of the air bag in case of a collision and eliminate endangerment to the infant in the infant seat.

10. An air bag deactivation buckle as recited in claim 9, wherein said deactivating means includes a normally closed air bag deactivator switch electrically connected to an air bag electrical system whereby when said tongue engages said air bag deactivator switch, the air bag electrical system will prevent inflation of the air bag.

11. An air bag deactivation buckle as recited in claim 10, wherein said air bag electrical system includes an ignition activated air bag actuation circuit electrically connected to said air bag deactivator switch.

12. An air bag deactivation buckle as recited in claim 11, wherein said air bag electrical system further includes two dashboard indicator warning lights panel, in which one said light indicates the air bag is operational, while other said light indicates the air bag is deactivated.

13. An air bag deactivation buckle as recited in claim 12, wherein said air bag electrical system further includes an audible signal circuit with a speaker electrically connected to said air bag deactivated light, so as to make an audio alarm when the air bag is deactivated.

14. An air bag deactivation buckle as recited in claim 13, further including:
  a) said frame being of a double configuration, having a second slot therein; and
  b) a second pushbutton lock mechanism adjacent said second slot in said frame providing a user with a choice between insertion of said tongue into said first slot, to prevent inflation of the air bag when using the infant seat on the seat of the motor vehicle and insertion of said tongue into said second slot to allow normal inflation of the air bag, when an adult passenger is held securely on the seat of the motor vehicle during a collision.

15. An air bag deactivation buckle as recited in claim 14, wherein said frame, said push button lock mechanism, said safety cover and said tongue are all fabricated out of stainless steel.

* * * * *